(12) United States Patent
Faaborg et al.

(10) Patent No.: US 9,443,094 B2
(45) Date of Patent: *Sep. 13, 2016

(54) METHODS AND SYSTEMS FOR CONTROLLING LEVELS OF GEOLOCATION ACCESS

(71) Applicant: Google Inc., Mountain View, CA (US)

(72) Inventors: Alexander Faaborg, Mountain View, CA (US); Andrew Theodore Wansley, San Francisco, CA (US); Angana Ghosh, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/803,787

(22) Filed: Jul. 20, 2015

(65) Prior Publication Data

US 2016/0217292 A1 Jul. 28, 2016

Related U.S. Application Data

(63) Continuation of application No. 13/921,268, filed on Jun. 19, 2013, now Pat. No. 9,117,088.

(51) Int. Cl.
*G06F 21/00* (2013.01)
*G06F 21/62* (2013.01)
*G06F 21/60* (2013.01)

(52) U.S. Cl.
CPC ............. *G06F 21/62* (2013.01); *G06F 21/604* (2013.01); *G06F 21/6245* (2013.01)

(58) Field of Classification Search
CPC ...... G06F 21/60; G06F 21/604; G06F 21/50; G06F 21/54; G06F 21/62
See application file for complete search history.

(56) References Cited

U.S. PATENT DOCUMENTS

| | | |
|---|---|---|
| 2003/0023726 A1 | 1/2003 | Rice et al. |
| 2009/0047972 A1 | 2/2009 | Neeraj |
| 2009/0186629 A1 | 7/2009 | Soelberg et al. |
| 2010/0064373 A1 | 3/2010 | Cai et al. |
| 2011/0055892 A1* | 3/2011 | Wang ............... G06F 21/82 726/3 |
| 2012/0311131 A1* | 12/2012 | Arrasvuori .......... G06F 21/6245 709/224 |
| 2013/0130654 A1 | 5/2013 | Kasad et al. |

OTHER PUBLICATIONS

International Search Report and Written Opinion of International Application No. PCT/US2014/043188 dated Feb. 11, 2015 (mailed Feb. 24, 2015).
Robert P. Minch, "Privacy Issues in Location-Aware Mobile Devices", Proceedings of the 37th Hawaii International Conference on System Sciences, 2004.

* cited by examiner

*Primary Examiner* — Edward Zee
(74) *Attorney, Agent, or Firm* — McDonnell Boehnen Hulbert & Berghoff LLP

(57) ABSTRACT

A communication device may be configured to control access to geolocation services for applications on the communication device utilizing a first privacy access level setting that enables access to the geolocation services when selected, a second privacy access level setting that disables access to the geolocation services when selected, and other privacy access level settings that are different from, and fall between, the first privacy access level setting and the second privacy access level setting, and enable one time access to the geolocation services for the communication device when selected. The applications can include applications on the communication device that are managed and/or handled by a particular application service provider. The privacy access level settings comprise an anonymous one-time access and a non-anonymous one-time access.

20 Claims, 6 Drawing Sheets

METHODS AND SYSTEMS FOR CONTROLLING LEVELS OF GEOLOCATION ACCESS

CROSS REFERENCE TO RELATED APPLICATION

The present application is a continuation of U.S. patent application Ser. No. 13/921,268, filed on Jun. 19, 2013, and entitled "Methods and Systems for Controlling Levels of Geolocation Access," which is herein incorporated by reference as if fully set forth in this description.

BACKGROUND

Applications and/or web based services generally utilize geolocation information to provide, for example, location based services such as directions and localized advertisements, shopping and/or other services. A user of a communication device running such applications may only have the capability to turn access to a location of the device on or off.

Further limitations and disadvantages of conventional and traditional approaches will become apparent to one of skill in the art, through comparison of such systems with some aspects of the present disclosure as set forth in the remainder of the present application with reference to the figures.

SUMMARY

In one aspect, a method is described. The method may comprise, on a communication device: controlling access to geolocation services for one or more applications utilizing multiple privacy access level settings. The multiple privacy access level settings may include: a first privacy access level setting that, when selected, enables access to the geolocation services; a second privacy access level setting that, when selected, disables access to the geolocation services; and at least one third privacy access level setting that is intermediate to the first privacy access level setting and the second privacy access level setting, the at least one third privacy access level setting, that when selected, enables one time access to the geolocation services for the communication device.

In another aspect, a system is described. The system may comprise at least one processor for use in a communication device. The system may also comprise data storage comprising instructions executable by the at least one processor to cause the system to perform functions. The functions may comprise controlling access to geolocation services for one or more applications utilizing multiple privacy access level settings. The multiple privacy access level settings may include: a first privacy access level setting that, when selected, enables access to the geolocation services, a second privacy access level setting that, when selected, disables access to the geolocation services, and at least one third privacy access level setting that is intermediate to the first privacy access level setting and the second privacy access level setting, the at least one third privacy access level setting, that when selected, enables one time access to the geolocation services for the communication device.

In yet another aspect, a computer readable device having stored thereon instructions, that when executed by a computing device, cause the computing device to perform functions is described. The functions may comprise controlling access to geolocation services for one or more applications utilizing multiple privacy access level settings. The multiple privacy access level settings may include: a first privacy access level setting that, when selected, enables access to the geolocation services; a second privacy access level setting that, when selected, disables access to the geolocation services; and at least one third privacy access level setting that is intermediate to the first privacy access level setting and the second privacy access level setting, the at least one third privacy access level setting, that when selected, enables one time access to the geolocation services for the communication device.

These and other advantages, aspects and features of the present disclosure, as well as details of an illustrated embodiment thereof, will be more fully understood from the following description and figures.

DETAILED DESCRIPTION

Figure 1:
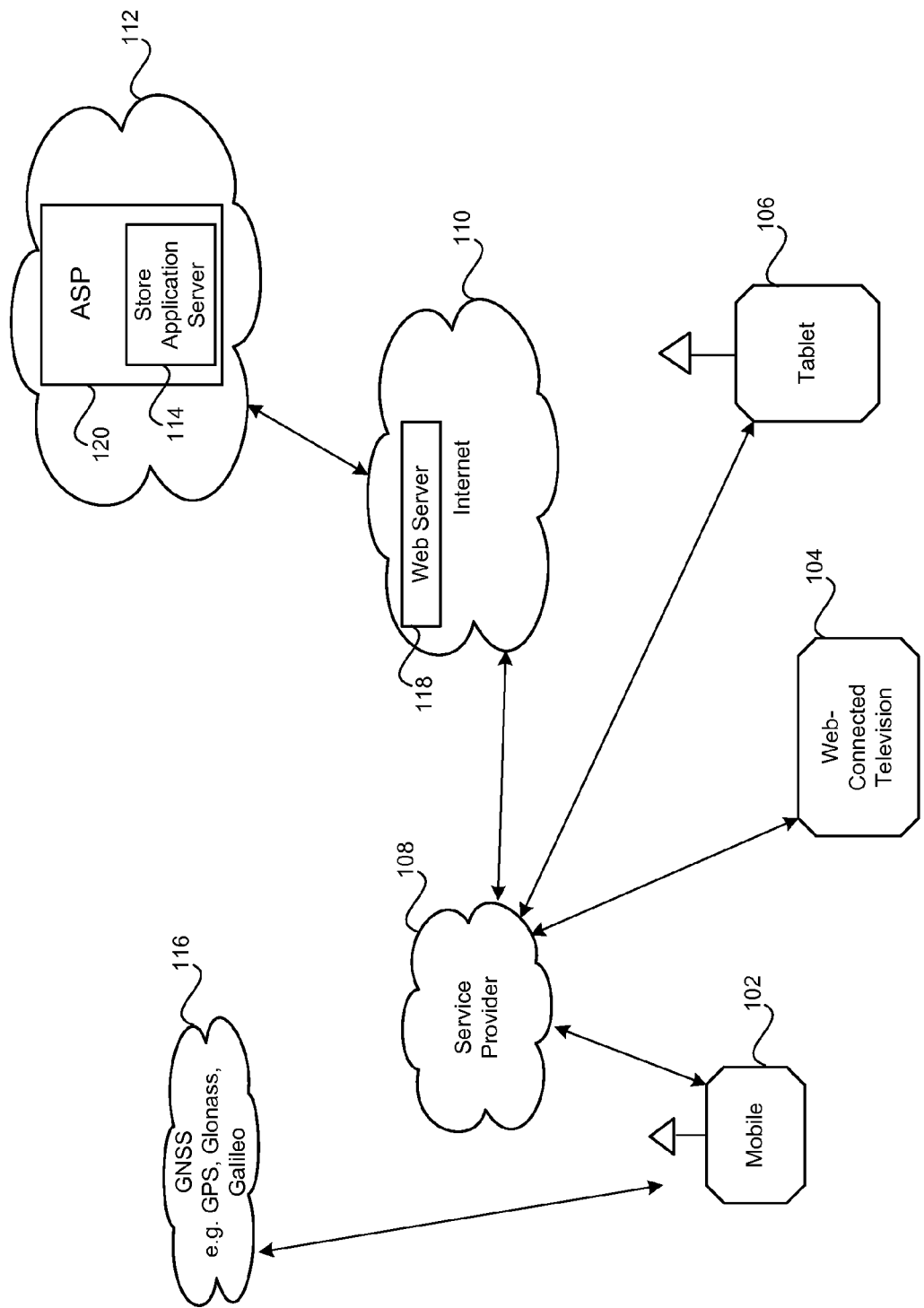
FIG. 1 is a block diagram of an example system for providing control over the level of geolocation access, in accordance with an embodiment of the disclosure.

Certain embodiments of the disclosure may be found in a method and system for control over the level of geolocation access. In various aspects of the disclosure, a communication device may be operable or configured to control access to geolocation services for one or more applications utilizing a sliding scale of privacy access levels comprising more than two privacy access level settings. The privacy access level settings may comprise a first privacy access level setting that, when selected, enables access to geolocation services, a second privacy access level setting that, when selected, disables access to geolocation services, and at least one third privacy access level setting that is intermediate to the first privacy access level setting and the second privacy access level setting. The at least one third privacy access level setting, when selected, enables one time access to geolocation services for the communication device. The one or more applications may comprise applications on the communication device that are handled and/or managed by a particular application service provider. The at least one third privacy access level setting comprises an anonymous one-time access and a non-anonymous one-time access.

It should be understood, however, that while various functions herein may be described as "anonymous" or "non-anonymous," selection data, such as selection data relating to a selection of a privacy access level setting, may not be tethered to the identity of individual users of the communication device. Further, users of the communication device may elect not to participate in non-anonymous data collection.

One or more dialogs, one or more radio buttons and/or a graphical interface may be generated on a display of the communication device to enable selection of the first privacy access level setting, the second privacy access level setting, and the at least one third privacy access level setting. The generated one or more dialogs, one or more radio buttons and/or graphical interfaces may be provided on the display of the mobile communication device when the one or more applications are being installed and/or updated, and/or when an action to change corresponding settings for the one or more applications is detected. Information corresponding to the first privacy access level setting, the second privacy access level setting, and the at least one third privacy access level setting may be stored in the memory in order to create a history of prior privacy access level settings for each of the one or more applications. A particular one of the first privacy access level setting, the second privacy access level setting, and the at least one third privacy access level setting may be assigned to be utilized for the one or more applications based on the history of prior privacy access level settings. A particular one of the first privacy access level setting, the second privacy access level setting, and the at least one third privacy access level setting may be assigned as a default privacy access level setting for the one or more applications. The default privacy access level setting may be assigned to each of the one or more applications when none of the one or more privacy access level settings is selected to be utilized as a corresponding privacy access level setting for each of the one or more applications on the communication device that are handled and/or managed by the particular application service provider.

FIG. 1 is a block diagram of an example system for providing control over the level of geolocation access, in accordance with an embodiment of the disclosure. Referring to FIG. 1, there is shown a mobile communication device 102, a web-connected television 104, a tablet 106, a service provider 108, the Internet 110, a web server 118, a Cloud 112, store application server 114, global navigation satellite system (GNSS) 116 and an application service provider (ASP) 120.

The mobile communication device 102 may comprise suitable logic, circuitry, interfaces and/or code that may be operable to handle wired and/or wireless communication. For example, the mobile communication device 102 may be operable to communicate using Ethernet, WWAN, WLAN, WPAN and/or other communication standards. The mobile communication device 102 may be operable to handle geolocation services or location based services based on a sliding scale of different privacy access levels for application on the mobile communication device 102 that are handled and/or managed by a particular application service provider. The mobile communication device 102 may receive communication services such as Internet based services via the service provider 108. The mobile communication device 102 may comprise a GNSS receiver that may be operable to receive navigational signals from the GNSS 116. The navigational signals may be utilized to determine a position and/or location of the mobile communication device 102. The determined position and/or location may be utilized by various applications and/or services to provide geolocation services or location based services that are specific to the mobile communication device 102.

The mobile communication device 102 may comprise an operating system platform that comprises integrated capability to provide user control over the level of geolocation access, other than merely enabling or disabling access to geolocation services. In accordance with various embodiments of the disclosure, the operating system platform comprises a platform-level module that enables a user of the mobile communication device 102 to select a privacy access level from a sliding scale of different privacy access levels for the various geolocation services that may be accessible.

The web-connected television 104 may comprise suitable logic, circuitry, interfaces and/or code that may be operable to receive traditional television services as well as communicate via the Internet 110. The web-connected television 104 may be operable to handle geolocation services or location based services based on a sliding scale of different privacy access levels for application on the web-connected television 104 that are handled and/or managed by a particular application service provider. In accordance with various embodiments of the disclosure, the location of the web-connected television 104 may be determined based on, for example, information stored in the web-connected television 104 and/or from devices that may be within the vicinity of the web-connected television 104 that may have a known determined location. For example, the location of a neighboring access point or router may be known and utilized to determine the location of the web-connected television 104. In some instances, as user of the web-connected television 104 may specify the address of the web-connected television 104 when setting up the web-connected television 104.

The web-connected television 104 may comprise an operating system platform that comprises integrated capability to provide user control over the level of geolocation access, other than merely enabling or disabling access to geolocation services. In accordance with various embodiments of the disclosure, the operating system platform comprises a platform-level module that enables a user of the web-connected television 104 to select a privacy access level from a sliding scale of different privacy access levels for the various geolocation services that may be accessible.

The tablet 106 may comprise suitable logic, circuitry, interfaces and/or code that may be operable to handle wireless communication. For example, the tablet 106 may be operable to communicate using Ethernet, WWAN, WLAN, WPAN and/or other communication standards. The tablet 106 may be operable to handle geolocation services or location based services based on a sliding scale of different privacy access levels for application on the tablet 106 that are handled and/or managed by a particular application service provider. The tablet 106 may be operable to receive communication services such as Internet based services via the service provider 108. The tablet 106 may comprise a GNSS receiver that may be operable to receive navigational signals from the GNSS 116. The navigational signals may be utilized to determine a position and/or location of the tablet 106. The determined position and/or location may be utilized by various applications and/or services to provide geolocation services or location based services that are specific to the tablet 106. In some instances, a location of a neighboring device such as an access point or router may be known and utilized to determine the location of the tablet 106.

The tablet 106 may comprise an operating system platform that comprises integrated capability to provide user control over the level of geolocation access, other than merely enabling or disabling access to geolocation services.

In accordance with various embodiments of the disclosure, the operating system platform comprises a platform-level module that enables a user of the tablet 106 to select a privacy access level from a sliding scale of different privacy access levels for the various geolocation services that may be accessible.

The service provider 108 may comprise suitable devices and/or interfaces that may be operable to provide Internet based connectivity to various communication devices. For example, the service provider may provide connectivity utilizing DSL, Cable (DOCSIS), WWAN, WMAN, WLAN, WPAN and/or other communication technologies. In this regard, the service provider 108 may provide services to the various communication devices using a wired and/or a wireless communication medium. For example, the service provider 108 may provide Internet services to each of the mobile communication device 102, the web-connected television 104 and the tablet 106 utilizing wireless technologies. The service provider 108 may provide Internet services to the web-connected television 104 utilizing a wired and/or wireless medium. The service provider 108 may comprise a cellular, satellite, cable or DSL service provider.

The Internet 110 may comprise suitable devices and interfaces that enable interconnectivity and communication amongst a network of computers, communication devices and servers. The service provider 108 may be operable to provide service to the Internet 110 for each of the mobile communication devices 102, the web-connected television 104 and the tablet 106. The Internet 110 and the Cloud 112 may host one or more application servers and/or content servers that may enable users of the mobile device 102, the web-connected television 104 and the tablet 106 to access various services and/or content.

The Cloud 112 may host one or more servers such as the store application server 114 that may enable users of the mobile device 102, the web-connected television 104 and/or the tablet 106 to access various services and/or content that may be stored within the Cloud 112. For example, the store application server 114 may serve the content to the mobile device 102, the web-connected television 104 and/or the tablet 106 in order to enable corresponding users of these devices to download, purchase, manipulate and/or interact with the content. The content in the Cloud 112 may be accessible to the mobile device 102 and the web-connected television 104 via the Internet 110.

The store application server 114 may comprise suitable logic, circuitry, interfaces and/or code that may be operable to serve and/or store applications and/or video game related information. The store application server 114 may be operated by an application service provider (ASP) 120, which may rent, sell, and/or provide for free, applications and/or content which may be accessible by the mobile communication device 102, the web-connected television 104 and/or the tablet 106. The application service provider 120 may be operable to handle and/or manage its applications and/or content that may be downloaded and/or be running on the mobile communication device 102, the web-connected television 104 and/or the tablet 106. Exemplary content may comprise books, magazines and other literature, music, games, video, and so on. In an embodiment of the disclosure, the store application server 114 may be operable to store accounting as well corresponding information that may be related to applications, and/or content that may be downloaded from the store application server 114 and/or may be running on the mobile communication device 102, the web-connected television 104 and/or the tablet 106. The application service provider 120 may utilize the store application server 114, which may be located in the Cloud 112, to keep a record of the applications, and/or content that may be rented to, purchased by or given for free to a particular user to enable subsequent installation, updates, re-installs on one or more of the mobile communication device 102, the web-connected television 104 and/or the tablet 106, and/or other devices utilized by a corresponding user.

The application service provider 120 may utilize the store application server 114 to gather information from the mobile communication device 102, the web-connected television 104 and/or the tablet 106 in order to provide specialized services associated to these devices. For example, the store application server 114 may be operable to acquire location information from one or more of the mobile communication device 102, the web-connected television 104 and/or the tablet 106 in order to provide localized advertisements when certain applications are being run on the corresponding devices. The acquired location information may also be utilized to determine demographical information for the corresponding device locations. The web server 118 may be operable to provide services as well as content to the mobile communication device 102, the web-connected television 104 and/or the tablet 106.

The global navigation satellite system 116 may comprise a plurality of orbiting satellites that may be operable to provide navigational signals. The communication devices such as the mobile communication device 102 and the tablet 106 may comprise one or more subsystems that may be utilized to provide location services. For example, the mobile communication device 102 and/or the tablet 106 may comprise a GNSS receiver that may be utilized to determine a location of the mobile communication device 102 and/or the tablet 106, respectively. The web-connected television 104 may or may not comprise a GNSS receiver.

The web server 118 may comprise suitable logic, circuitry, interfaces and/or code that may be operable to serve content comprising multimedia data, games, applications, books, merchandise and so on. Multimedia data may comprise text, audio, video, games, books, literature and other forms of data. In an embodiment of the disclosure, the store application server 114 may be operable to store accounting as well corresponding information that may be related to content that may be served by the web server 118. The web server 118 may be operable to utilize information gathered from the mobile communication device 102, the web-connected television 104 and/or the tablet 106 in order to provide specialized services associated to these devices. For example, the web server 118 may be operable to acquire location information from one or more of the mobile communication device 102, the web-connected television 104 and/or the tablet 106 in order to provide localized advertisements when browsing or when certain applications are being run on the corresponding devices.

In operation, one or more of the mobile communication device 102, the web-connected television 104 and/or the tablet 106 may be operable to run an application that may be downloaded from the store application server 114 or run an application that may otherwise be located on the each of the mobile communication device 102, the web-connected television 104 and/or the tablet 106. The application may be managed and/or handled by the application service provider 120 that controls operation of the store application server 114. A user of, for example, the mobile communication device 102 may have previously configured the mobile communication device 102 by selecting one of the privacy access levels from the sliding scale of different privacy access levels. The selected privacy access level may serve as the current privacy access level for applications running on the mobile communication device 102, which are managed and/or handled by the application service provider 120 for the various geolocation services.

A user of the web-connected television 104 may be utilizing an application from the application service provider 120 to browse the Internet and may access a website on the Internet 110 that requires the location of the web-connected television 104 in order to provide content and/or advertisements that may be associated with that location. The web server 118, which may be serving the web page, may request permission from the web-connected television 104 to acquire the location of the web-connected television 104. Once the request for permission is received, the request may be processed in accordance with the current access level privacy setting on the web-connected television for that application, which is handled and/or managed by the application service provider 120.

The request may be handled in a manner that may be consistent with the current privacy access level setting. In one example, the user may have previously utilized the sliding scale of different privacy access levels for the various geolocation services to configure the current privacy access level for applications handled by that application service provider to provide anonymous location reporting. In this regard, the application is allowed to access the location of the web-connected television 104 and send the corresponding anonymous location data to the web server 118. In another example, the user may have previously utilized the sliding scale of different privacy access levels for the various geolocation services to configure the current privacy access level for applications handled by that application service provider to provide non-anonymous location reporting. In this regard, the application is allowed to access the current location of the web-connected television 104 but the browser and/or the web-server 118 do not save the corresponding location data.

Figure 2:
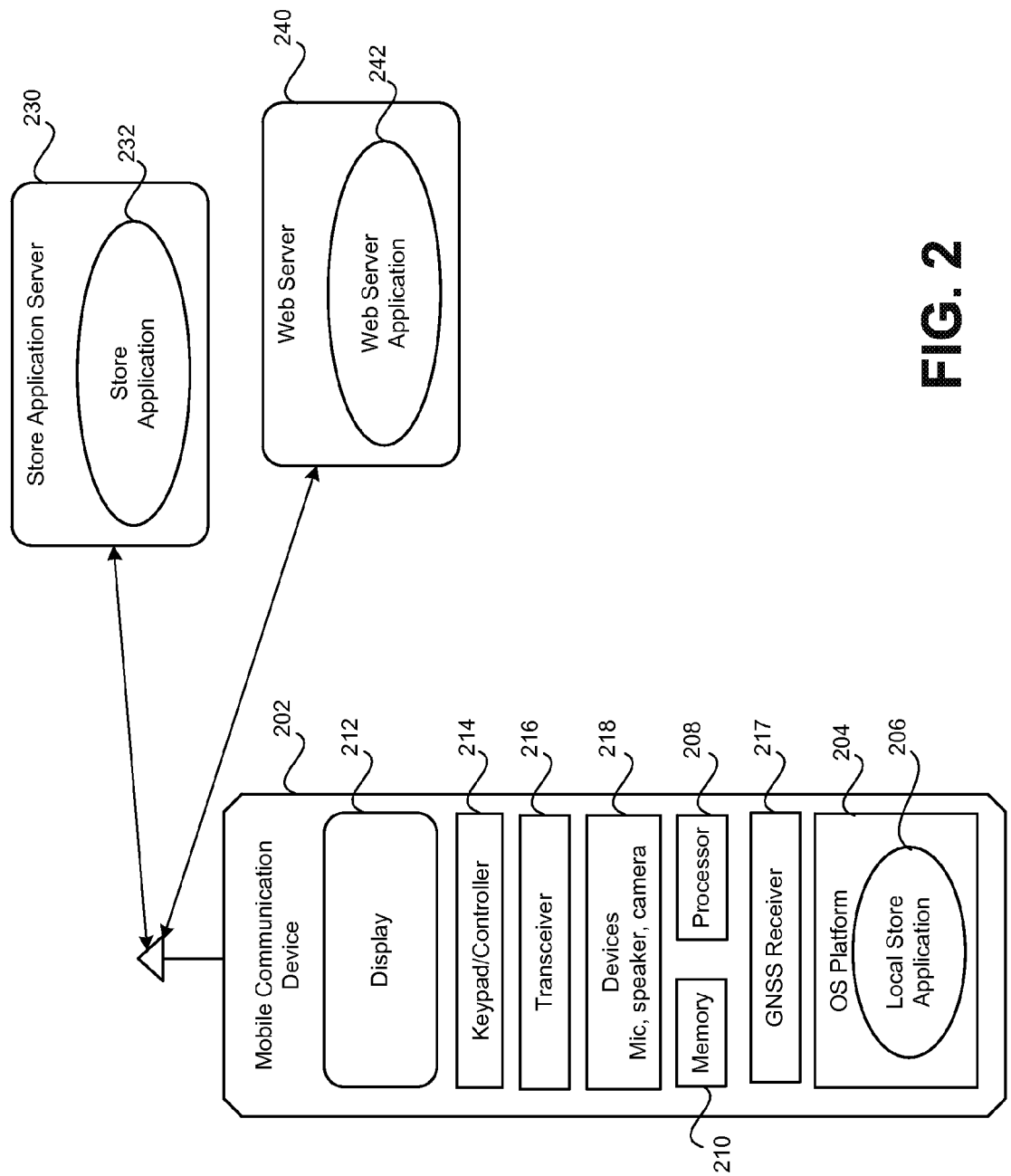
FIG. 2 is a block diagram that illustrates example remote services and a mobile communication device that is operable to provide control over the level of geolocation access, in accordance with an embodiment of the disclosure.

FIG. 2 is a block diagram that illustrates example remote services and a mobile communication device that is operable to provide user control over the level of geolocation access, in accordance with an embodiment of the disclosure. Referring to FIG. 2, there is shown a mobile communication device 202, a store application server 230 and a web server 240. The mobile communication device 202 comprises an operating system (OS) platform 204, a processor 208, memory 210, display 212, keypad controller 214, a transceiver 216 and a GNSS receiver 217. The OS platform 204 comprises a local store application module 206. The mobile communication device 202 may also comprise a microphone, speaker and a camera, which are collectively referenced as devices 218. The store application server 230 may comprise a store application 232 and the web server 240 may comprise a web server application 242.

The mobile communication device 202 may comprise suitable logic circuitry, interfaces and/or code that may be operable to communicate utilizing one or more wired and/or wireless technologies. In an example embodiment of the disclosure, the mobile communication device 202 may communicate wirelessly utilizing 802.11 a/b/g/n/e, 802.16, 3G, 4G, and Bluetooth. In one embodiment of the disclosure, the mobile communication device 202 may comprise a smartphone or a tablet. The mobile communication device 202 may comprise an OS platform 204 that is operable to handle the sliding scale of different privacy access levels for the various geolocation or location based services.

The OS platform 204 may comprise suitable logic, interfaces and/or code that may be operable to control operation of the mobile communication device 202. For example, the OS platform 204 may enable a user to interact with mobile communication device 202 and to run or execute applications, and configure settings for the mobile communication device 202. The OS platform 204 may comprise a local store application module 206 which may be operable to handle the sliding scale of different privacy access levels for the various geolocation or location based services.

The local store application module 206 is integrated as part of the OS platform 204 and may comprise suitable logic, interfaces and/or code that may be operable to provide the sliding scale of different privacy access levels for the various geolocation or location based services. In this regard, the local store application module 206 is not an application that runs on the operating system platform 204, but instead, is integrated as part of the operating system platform 204. In an example embodiment of the disclosure, the local store application module 206 may enable a user of the mobile communication device 202 to select from a plurality of different privacy access levels which ranges from a privacy access level setting that is disabled to a privacy access level that is fully enabled, with one or more privacy access level settings therebetween. For example, the local store application module 206 may be operable to provide the sliding scale of a plurality of privacy access level settings in which there may be no access to geolocation services, anonymous one-time access to the geolocation services, non-anonymous one-time access to the geolocation services and ongoing access to the geolocation services.

The processor 208 may comprise suitable logic, circuitry, interfaces, and/or code that may be operable to execute code or otherwise control operation of the mobile communication device 202. For example, the processor 208 may be operable to control the OS platform 204, the local store application 206, the memory 210, the display 212, the keypad/controller 214, the transceiver 216, the GNSS receiver 217 and/or the devices 218. In accordance with various embodiments of the disclosure, the processor 208 may be operable to handle operations of the local store application 206, which may be utilized to provide the sliding scale of the plurality of privacy access level settings. For example, the processor 208 may be operable to detect when there may be a request to access the location of the mobile communication device 202. Accordingly, the processor 208 may be operable to execute code for the local store application 206 in order to determine the current privacy access level setting. The processor 208 may be operable to handle the request based on the determined current privacy access level setting.

The processor 208 may comprise one or more general purpose processors (e.g., microprocessors) and/or one or more special purpose processors (e.g., DSPs, GPUs, FPUs, network processors, or ASICs). The processor 208 may be capable of executing program instructions (e.g., compiled or non-compiled program logic and/or machine code) stored in the memory 210 to carry out the various functions described herein.

The memory 210 may comprise suitable logic, circuitry, interfaces, and/or code that may be operable to store operating and temporary data for the mobile communication device 202. For example, the memory 210 may be enabled to store configurations and operating data for the mobile communication device 202. The memory 210 may be operable to store OS platform information and data, as well as data utilized by the local store application 206 for the sliding scale of the plurality of privacy access level settings.

The display 212 may comprise suitable logic, circuitry, interfaces, and/or code that may be operable to display a user interface that enables a user to interact with the mobile communication device 202. For example, the display 212 may be utilized to configure the mobile communication device 202 as well as provide user interaction with the mobile communication device 202. In this regard, the display 212 may provide visual and/or touch interaction for the mobile communication device 202. The display 212 may comprise LED, LCD or variants thereof.

The keypad controller 214 may comprise suitable logic, circuitry, interfaces, and/or code that may be operable to control and manipulate the communication device 202. In this regard, the keypad controller 214 may be utilized to control applications, which may be running on the mobile communication device 202 in order to interact with display content. The keypad controller 214 may comprise a physical set of keys or buttons, and/or a software generated set of keys.

The transceiver 216 may comprise suitable logic, circuitry, interfaces, and/or code that may be operable to wireless communication for the mobile communication device 202. For example, the transceiver 216 may be operable to handle wireless technologies such as 802.11 a/b/g/n/e, 802.16, 3G, 4G, and Bluetooth. Although a single transceiver is shown, there may be a plurality of transceivers to handle a plurality of wireless communication technologies for different networks ranging from wireless wide area networks (WWANs), wireless medium area networks (WMANs), wireless local area networks (WLANs), and personal area networks (PANs).

The mobile communication device 202 may also comprise a microphone, speaker and a camera, which are collectively referenced as devices 218. The microphone and camera may be operable to capture video and/or corresponding audio that may be associated with content being handled by the mobile communication device 202. The speaker may be utilized to play audio or provide sounds to aid input or interaction. In instances where the mobile communication device 202 is a smartphone, the microphone, speaker and/or camera 218 may be integrated as part of the smartphone.

The store application server 230 may comprise suitable logic circuitry, interfaces and/or code that may be operable to provide a store service to the mobile communication device 202. In this regard, the store application server 230 may be operable to provide paid or free applications and/or content to the mobile communication device 202. The store application server 230 may be substantially similar to the store application server 114, which is illustrated in FIG. 1. The store application server 230 may control the application service provider 120.

The store application 232 may comprise suitable logic circuitry, interfaces and/or code that may be operable to handle the operation of the store application server 230. For example, the store application 232 may be utilized to handle various accounting tasks, and keep a record of and/or manage applications and/or content handled by the store application server 230. In this regard, the store application 232 may keep a record of applications and manage applications for the application service provider 120, which may have been downloaded from the store application server 230 to the mobile communication device 202.

The web server 240 may comprise suitable logic circuitry, interfaces and/or code that may be operable to provide applications and/or content to the mobile communication device 202. For example, the web server 240 may be operable to host various web sites that offer various types of Internet based services which may be accessible via the applications. In this regard, the web server 240 may be operable to provide various paid or free applications and/or content to the mobile communication device 202 utilizing the corresponding applications, which are downloaded to the mobile communication device 202.

The web server application 242 may comprise suitable logic circuitry, interfaces and/or code that may be operable to handle the operations of the store application server 230. For example, the web server application 242 may be utilized to handle various accounting tasks, and keep a record of and/or manage applications and/or content handled by the web server 240. The web server application 242 may also be operable to request the location of the mobile communication device 202 in order to provide various services and/or perform certain tasks for the mobile communication device 202.

In operation, a user of the mobile communication device 202 may configure the privacy access level setting for geolocation or location based settings for applications that may be handled and/or managed by the application service provider 120 through the store application server 230. In this regard, the user may select a privacy access level setting from the sliding scale of different privacy access levels to serve as the current privacy access level for the applications for the various geolocation or location based services. The sliding scale of different privacy access levels may comprise, for example, no access to geolocation services, anonymous one-time access to the geolocation services, non-anonymous one-time access to the geolocation services and ongoing access to the geolocation services. The no access to geolocation settings is on one end of the sliding scale of the privacy access levels and disables access to the geolocation settings. The ongoing access to the geolocation services is at the other end of the sliding scale of the privacy access levels. The other privacy access levels may fall between the no access to geolocation settings and the ongoing access to geolocation settings. The selected privacy access level setting may remain as the current privacy access level setting until it is changed. In some instances, if no privacy access level is selected, one of the different privacy access level settings on the sliding scale of different privacy access levels may be assigned as a default privacy access level setting.

A user of the mobile communication device 202 may launch the local store application 206, which may access a web based service provided by a website that may be hosted by the web server 240. The local store application 206 may be an application that may be handled and/or managed by the application service provider 120 through the store application server 230. The web server application 242 may handle the web based service that is provided by the website. The web server application 242 may request the location of the mobile communication device 202 from the mobile communication device 202. The location application 206 may receive the request and determine the current privacy access level setting for the mobile communication device 202. Once the location application 206 determines the current privacy access level setting for the mobile communication device 202, the processor 208 may be operable to process the request in accordance with the determined current privacy access level setting. If the determined current privacy access level setting is anonymous location reporting, the web browser is allowed to access the location of the web-connected television 104 and send the corresponding anonymous location data to the web server 118. If the determined current privacy access level setting is a non-anonymous location reporting, then the web browser is allowed to access the current location of the web-connected television 104 but the browser and/or the web-server 118 do not save the corresponding location data. As noted above, users of the communication device may elect not to participate in non-anonymous data collection, as well as data reporting, such as location data reporting.

Figure 3:
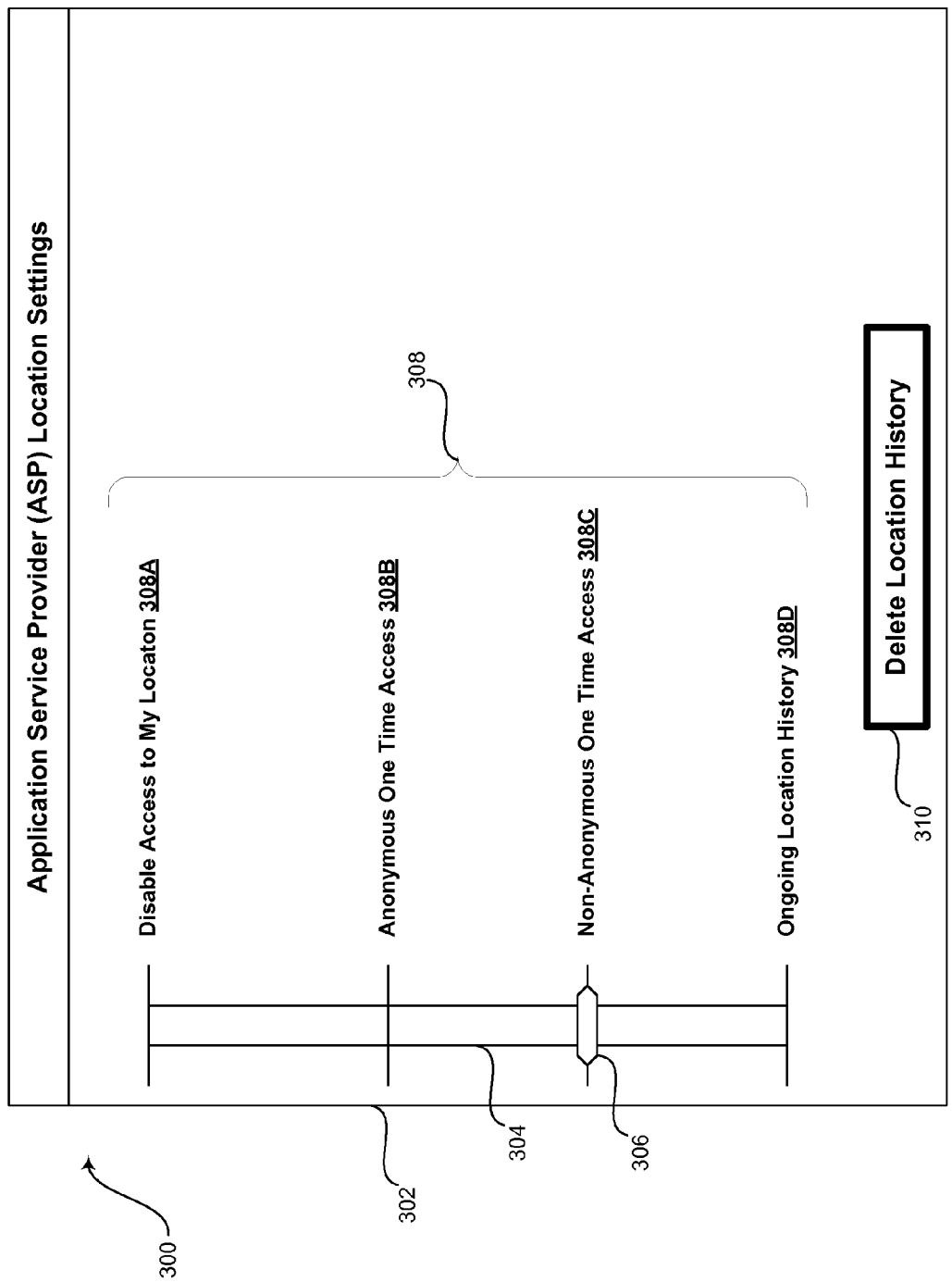
FIG. 3 is a diagram that illustrates example privacy access level settings for geolocation services on a communication device, in accordance with various embodiments of the disclosure.

FIG. 3 is a diagram that illustrates example privacy access level settings for geolocation services on a communication device, in accordance with various embodiments of the disclosure. Referring to FIG. 3, there is shown a FIG. 300 comprising an application service provider (ASP) settings page 302. The application service provider settings page 302 may comprise a privacy access level sliding bar 304, a slider 306 and a delete location history button 310. The privacy access level sliding bar 304 may comprise a plurality of privacy access level settings 308A, 308B, 308C and 308D, which may be collectively referenced as 308.

The application service provider settings page 302 may provide settings for one or more of the applications on a communication device such as the mobile communication device 202, which may be handled or managed by the application service provider 120 through the store application server 230.

The privacy access level sliding bar 304 may comprise a sliding bar that enables a user to select one of the privacy access level settings 308A, 308B, 308C and 308D as the current privacy level setting for the applications on the communication device that are handled and/or managed by the application service provider.

The slider 306 on the privacy access level sliding bar 304 is utilized to select and designate the selected or current privacy access level setting. Referring to FIG. 3, the slider 306 designates the "non-anonymous one-time access" setting 308C as the current privacy access level setting.

The privacy access level setting 308A comprises a "disable access to my location" setting. This setting disables access to the communication devices' location for geolocation and/or location based services. Accordingly, a request for location information for a communication device will be denied.

The privacy access level setting 308B comprise an "anonymous one-time access" setting. This setting allows anonymous location data to be sent to the application service provider for the applications on the communication device that are managed and/or handled by the application service provider.

The privacy access level setting 308C comprise a "non-anonymous one-time access" setting. This setting allows applications on the communication device that are handled by the application service provider to access the current location of the communication device without saving corresponding location data.

The privacy access level setting 308D comprise an "ongoing location history" setting. This setting allows location history as well as current location information to be provided to the application service provider as well as being shared among other applications on the communication device that are handled and/or managed by the application service provider.

The delete location history button 310 is utilized to clear or delete the location history for the applications on the communication device that are managed and/or handled by the application service provider.

Figure 4:
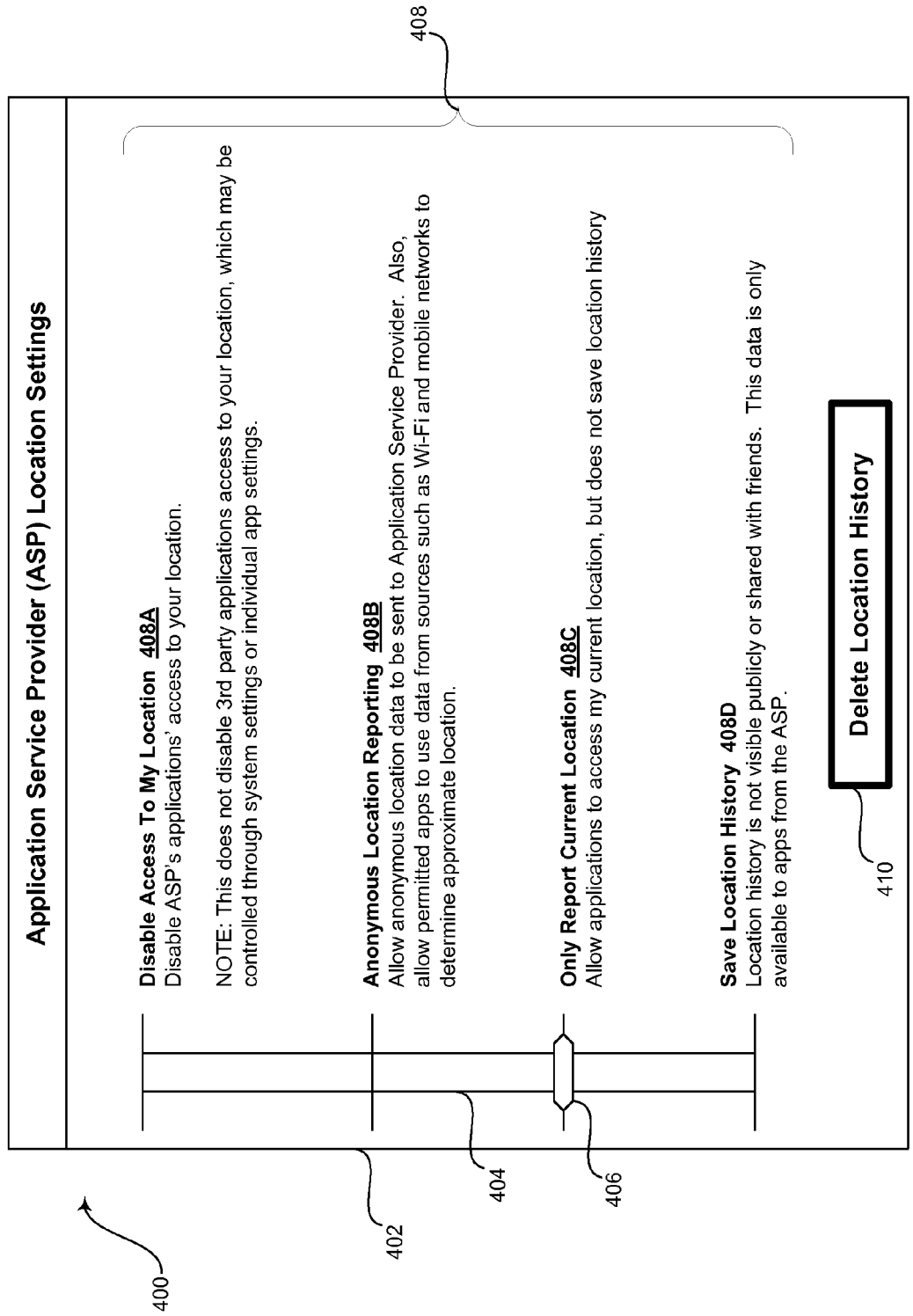
FIG. 4 is a diagram that illustrates example privacy access level settings for geolocation services on a communication device, in accordance with various embodiments of the disclosure.

FIG. 4 is a diagram that illustrates example privacy access level settings for geolocation services on a communication device, in accordance with various embodiments of the disclosure. Referring to FIG. 4, there is shown a FIG. 400 comprising an application service provider (ASP) settings page 402. The application service provider settings page 402 may comprise a privacy access level sliding bar 404, a slider 406 and a delete location history button 410. The privacy access level sliding bar 404 may comprise a plurality of privacy access level settings 408A, 408B, 408C and 408D, which may be collectively referenced as 408.

The application service provider settings page 402 may provide settings for one or more of the applications on a communication device such as the mobile communication device, which are handled or managed by the application service provider.

The privacy access level sliding bar 404 may comprise a sliding bar that enables a user to select one of the privacy access level settings 408A, 408B, 408C and 408D as the current privacy level settings for the applications on the communication device that are handled and/or managed by the application service provider.

The slider 406 on the privacy access level sliding bar 404 is utilized to select and designate the selected or current privacy access level setting. Referring to FIG. 4, the slider 406 designates the "Only Report Current Location" setting 408C as the current privacy access level setting.

The privacy access level setting 408A comprises a "Disable Access To My Location" setting. This setting disables the application service providers' applications access to the communication devices' location for geolocation and/or location based services. This setting does not disable $3^{rd}$ party applications' access to the location of the communication device, which may be controlled through other system settings or individual application settings.

The privacy access level setting 408B comprises an "Anonymous Location Reporting" setting. This setting allows anonymous location data to be sent to the application service provider for the applications on the communication device that are managed and/or handled by the application service provider. This setting may also allow permitted applications to use data from other sources such as WiFi, Bluetooth, and mobile networks to determine approximate location. For example, location may be determined from a neighboring device such as an access point or other communication device whose location may be known and/or fixed.

The privacy access level setting 408C comprises an "Only Report Current Location" setting. This setting allows applications to access the current location of the communication device but does not save the location history.

The privacy access level setting 408D comprises a "Save Location History" setting. With this setting, the location history is not publicly visible or accessible or shared with friends. This location history is only available to applications on the communication device that are handled and/or managed by the application service provider.

The delete location history button 410 is utilized to clear or delete the location history for the applications on the communication device that are managed and/or handled by the application service provider.

Figure 5:
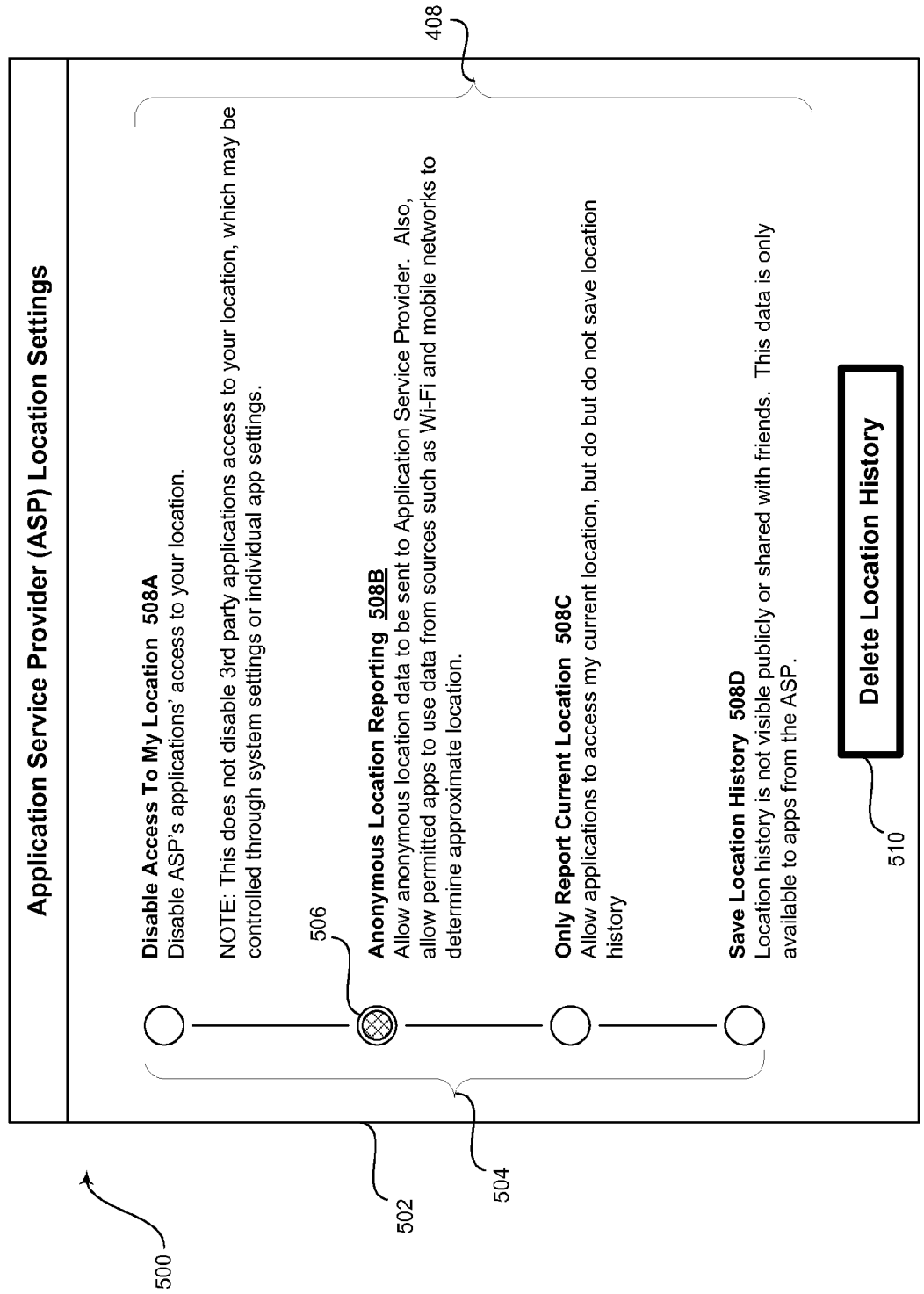
FIG. 5 is a diagram that illustrates example privacy access level settings for geolocation services on a communication device, in accordance with various embodiments of the disclosure.

FIG. 5 is a diagram that illustrates example privacy access level settings for geolocation services on a communication device, in accordance with various embodiments of the disclosure. Referring to FIG. 5, there is shown a FIG. 500 comprising an application service provider (ASP) settings page 502. The application service provider settings page 502 may comprise a privacy access level sliding bar 504, an indicator 506 and a delete location history button 510. The privacy access level sliding bar 504 may comprise a plurality of privacy access level settings 508A, 508B, 508C and 508D, which may be collectively referenced as 508.

The application service provider (ASP) settings page 502 may be substantially similar to the application service provider (ASP) settings page 402 of FIG. 4. However, instead of the privacy access level sliding bar 404 and the slider 406, which are shown in FIG. 4, FIG. 5 shows circular icons next to each of the privacy access level settings 508A, 508B, 508C and 508D. When a privacy access level setting is selected as the current privacy access level setting, the icon is shaded or filled in as illustrated with the indicator 506. In this regard, the "Anonymous Location Reporting" setting 508B is the current privacy access level setting.

Figure 6:
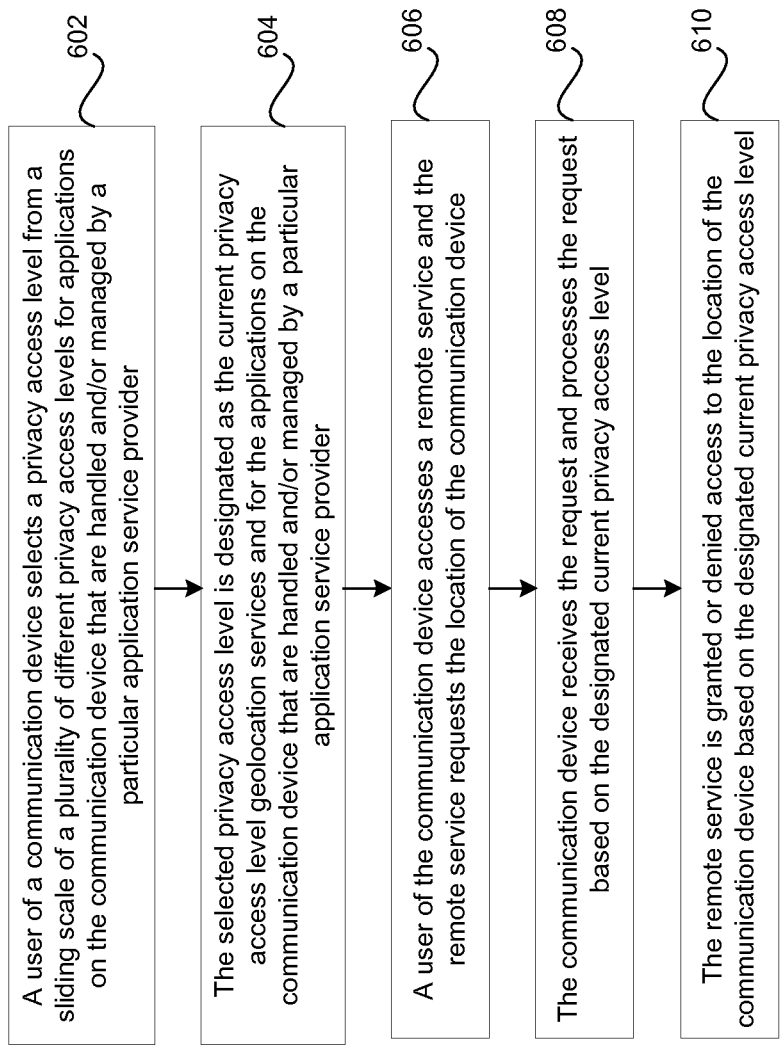
FIG. 6 is a flow chart that illustrates example functions for controlling access to geolocation services utilizing a sliding scale of privacy access levels, in accordance with an embodiment of the disclosure.

FIG. 6 is a flow chart that illustrates example functions for controlling access to geolocation services utilizing a sliding scale of privacy access levels, in accordance with an embodiment of the disclosure. Referring to FIG. 6, there are shown example functions 602 through 610. In block 602, a user of a communication device may select a privacy access level from a sliding scale of a plurality of different privacy access levels for applications on the communication device that are handled and/or managed by a particular application service provider. This may occur when one or more applications are being installed and/or updated, and/or whenever an action to change corresponding settings for the one or more applications is detected. In block 604, the selected privacy access level may be designated as the current privacy access level setting for geolocation services and for the applications on the communication device that are handled and/or managed by the particular application service provider. In block 606, a user of the communication device accesses a remote service, for example, a website, and the remote service requests the location of the communication device. In block 608, the communication device receives the request and processes the request based on the designated current privacy access level. In step 610, the remote service is granted or denied access to the location of the communication device based on the designated current privacy access level.

In certain embodiments of the disclosure, a communication device such as the mobile communication device 202 may be operable to control access to geolocation services for one or more applications utilizing more than two privacy access level settings. The privacy access level settings may comprise a first privacy access level setting that, when selected, enables access to geolocation services, a second privacy access level setting that, when selected, disables access to geolocation services, and at least one third privacy access level setting that is intermediate to the first privacy access level setting and the second privacy access level setting. The at least one third privacy access level setting, when selected, enables one time access to geolocation services for the communication device. For the first privacy access level setting, 308D, access to geolocation services is on and for the second privacy access level setting, 308A, access to geolocation services is off. For the at least one third privacy access level setting, 308B, 308C, one time access to geolocation services for the communication device is enabled. The one or more applications comprise applications on the communication device 202 that are handled and/or managed by a particular application service provider. The at least one third privacy access level setting comprises an anonymous one-time access 308B and a non-anonymous one-time access 308C.

One or more dialogs, one or more radio buttons and/or a graphical interface may be generated on a display 212 of the communication device 202 to enable selection of the first privacy access level setting, the second privacy access level setting, and the at least one third privacy access level setting. The generated one or more dialogs, one or more radio buttons and/or graphical interfaces may be provided on the display 212 of the mobile communication device 202 when the one or more applications are being installed and/or updated, and/or when an action to change corresponding settings for the one or more applications is detected. Information corresponding to the first privacy access level setting, the second privacy access level setting, and the at least one third privacy access level setting may be stored in the memory 210 in order to create a history of prior privacy access level settings for each of the one or more applications. A particular one of the first privacy access level setting, the second privacy access level setting, and the at least one third privacy access level setting 308A, 308B, 308C, 308D may be assigned by the processor 208 to be utilized for the one or more applications based on the history of prior privacy access level settings. A particular one of the one or more privacy access level settings 308A, 308B, 308C, 308D may be assigned as a default privacy access level setting for the one or more applications. The default privacy access level setting may be assigned to each of the one or more applications when none of the one or more privacy access level settings is selected to be utilized as a corresponding privacy access level setting for each of the one or more applications on the communication device that are handled and/or managed by the particular application service provider.

Example embodiments of the disclosure may provide a machine or computer readable device, having stored thereon instructions executable by a machine and/or a computer, thereby causing the machine and/or computer to perform the functions as described herein for user control over the level of geolocation access.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodi-

What is claimed is:

1. A method, comprising:
on a communication device:
controlling access to geolocations of the communication device for a particular application service provider utilizing multiple privacy access level settings, the multiple privacy access level settings including:
a first privacy access level setting that, when selected, (i) causes the communication device to store, in a memory accessible by the communication device, information indicative of a history of the geolocations of the communication device, and (ii) enables one or more applications associated with the particular application service provider to access the stored history;
a second privacy access level setting that, when selected, (i) denies the one or more applications access to the geolocations of the communication device, and (ii) causes the communication device to not include the geolocations of the communication device in the stored history;
at least one third privacy access level setting that is intermediate to the first privacy access level setting and the second privacy access level setting, the at least one third privacy access level setting, that when selected, enables the one or more applications associated with the particular application service provider limited access to the geolocations for the communication device; and
a fourth privacy access level setting that, when selected, causes the communication device to delete the stored history of the geolocations of the communication device.

2. The method of claim 1, wherein the at least one third privacy access level setting, when selected, further causes the communication device to not store in the memory the information indicative of the history of the geolocations of the communication device, and
wherein enabling the one or more applications associated with the particular application service provider limited access to the geolocations for the communication device comprises enabling the one or more applications associated with the particular application service provider to access only a current geolocation of the communication device.

3. The method of claim 1, further comprising:
storing information corresponding to one or more selected prior privacy access level settings to create a history of prior privacy access level settings for the one or more applications associated with the particular application service provider; and
based on the history of prior privacy access level settings, assigning a particular one of the first privacy access level setting, the second privacy access level setting, and the at least one third privacy access level setting to be utilized for the one or more applications.

4. The method of claim 1, wherein the limited access to the geolocation services comprises an anonymous one-time access and a non-anonymous one-time access.

5. The method of claim 1, wherein controlling access to the geolocations of the communication device for the particular application service provider utilizing multiple privacy access level settings comprises:
providing, on a display of the communication device, a graphical user interface comprising one or more dialogs and one or more radio buttons prompting and enabling selection of the first privacy access level setting, the second privacy access level setting, the at least one third privacy access level setting, and the fourth privacy access level setting;
receiving, by the communication device, an input indicative of a selection of one of the multiple privacy access level settings; and
in response to receiving the input indicative of the selection, controlling access to the geolocations of the communication device for the one or more applications associated with the particular application service provider in accordance with the one selected privacy access level setting.

6. The method of claim 5, further comprising providing the graphical user interface on the display in response to: the one or more applications being installed and/or updated, and the communication device receiving an input indicative of a request to change corresponding settings for the one or more applications.

7. The method of claim 1, further comprising:
defining a particular one of the first privacy access level setting, the second privacy access level setting and the at least one third privacy access level setting as a default privacy access level setting for the one or more applications; and
assigning the default privacy access level setting to the one or more applications when none of the one or more privacy access level settings is assigned to be utilized as a corresponding privacy access level setting for the one or more applications.

8. A system, comprising:
at least one processor for use in a communication device; and
data storage comprising instructions executable by the at least one processor to cause the system to perform operations comprising:
controlling access to geolocations of the communication device for a particular application service provider utilizing multiple privacy access level settings, the multiple privacy access level settings including:
a first privacy access level setting that, when selected, (i) causes the communication device to store, in a memory accessible by the communication device, information indicative of a history of the geolocations of the communication device, and (ii) enables one or more applications associated with the particular application service provider to access the stored history;
a second privacy access level setting that, when selected, (i) denies the one or more applications access to the geolocations of the communication device, and (ii) causes the communication device to not include the geolocations of the communication device in the stored history;
at least one third privacy access level setting that is intermediate to the first privacy access level setting and the second privacy access level setting, the at least one third privacy access level setting, that when selected, enables the one or more applications associated with the particular application service provider limited access to the geolocations for the communication device; and a fourth privacy access level setting that, when selected, causes the communication device to delete the stored history of the geolocations of the communication device.

9. The system of claim 8, the operations further comprising:
storing information corresponding to one or more selected prior privacy access level settings to create a history of prior privacy access level settings for one or more applications associated with the particular application service provider; and
based on the history of prior privacy access level settings, assigning a particular one of the first privacy access level setting, the second privacy access level setting, and the at least one third privacy access level setting to be utilized for the one or more applications.

10. The system of claim 8, wherein the limited access to the geolocation services comprises an anonymous one-time access and a non-anonymous one-time access.

11. The system of claim 8, wherein controlling access to the geolocations of the communication device for the particular application service provider utilizing multiple privacy access level settings comprises:
providing, on a display of the communication device, a graphical user interface comprising one or more dialogs and one or more radio buttons prompting and enabling selection of the first privacy access level setting, the second privacy access level setting, the at least one third privacy access level setting, and the fourth privacy access level setting;
receiving, by the communication device, an input indicative of a selection of one of the multiple privacy access level settings; and
in response to receiving the input indicative of the selection, controlling access to the geolocations of the communication device for the one or more applications associated with the particular application service provider in accordance with the one selected privacy access level setting.

12. The system of claim 11, the operations further comprising:
providing the graphical user interface on the display in response to: the one or more applications being installed and/or updated, and the communication device receiving an input indicative of a request to change corresponding settings for the one or more applications.

13. The system of claim 8, the operations further comprising:
defining a particular one of the first privacy access level setting, the second privacy access level setting and the at least one third privacy access level setting as a default privacy access level setting for the one or more applications; and
assigning the default privacy access level setting to the one or more applications when none of the one or more privacy access level settings is assigned to be utilized as a corresponding privacy access level setting for the one or more applications.

14. The system of claim 8, wherein the at least one third privacy access level setting, when selected, further causes the communication device to not store in the memory the information indicative of the history of the geolocations of the communication device, and
wherein enabling the one or more applications associated with the particular application service provider limited access to the geolocations for the communication device comprises enabling the one or more applications associated with the particular application service provider to access only a current geolocation of the communication device.

15. A non-transitory computer-readable medium having stored thereon program instructions that when executed by a computing device cause the computing device to perform operations comprising:
controlling access to geolocations of a communication device for a particular application service provider utilizing multiple privacy access level settings, the multiple privacy access level settings including:
a first privacy access level setting that, when selected, (i) causes the communication device to store, in a memory accessible by the communication device, information indicative of a history of the geolocations of the communication device, and (ii) enables one or more applications associated with the particular application service provider to access the stored history;
a second privacy access level setting that, when selected, (i) denies the one or more applications access to the geolocations of the communication device, and (ii) causes the communication device to not include the geolocations of the communication device in the stored history;
at least one third privacy access level setting that is intermediate to the first privacy access level setting and the second privacy access level setting, the at least one third privacy access level setting, that when selected, enables the one or more applications associated with the particular application service provider limited access to the geolocations for the communication device; and
a fourth privacy access level setting that, when selected, causes the communication device to delete the stored history of the geolocations of the communication device.

16. The non-transitory computer-readable medium of claim 15, wherein the at least one third privacy access level setting, when selected, further causes the communication device to not store in the memory the information indicative of the history of the geolocations of the communication device, and
wherein enabling the one or more applications associated with the particular application service provider limited access to the geolocations for the communication device comprises enabling the one or more applications associated with the particular application service provider to access only a current geolocation of the communication device.

17. The non-transitory computer-readable medium of claim 15, wherein the limited access to the geolocation services comprises an anonymous one-time access and a non-anonymous one-time access.

18. The non-transitory computer-readable medium of claim 15, the operations further comprising:
storing information corresponding to one or more selected prior privacy access level settings to create a history of prior privacy access level settings for one or more applications associated with the particular application service provider; and
based on the history of prior privacy access level settings, assigning a particular one of the first privacy access level setting, the second privacy access level setting, and the at least one third privacy access level setting to be utilized for the one or more applications.

19. The non-transitory computer-readable medium of claim 15, wherein controlling access to the geolocations of the communication device for the particular application service provider utilizing multiple privacy access level settings comprises:
  providing, on a display of the communication device, a graphical user interface comprising one or more dialogs and one or more radio buttons prompting and enabling selection of the first privacy access level setting, the second privacy access level setting, the at least one third privacy access level setting, and the fourth privacy access level setting, wherein the graphical user interface is provided in response to: the one or more applications being installed and/or updated, and the communication device receiving an input indicative of a request to change corresponding settings for the one or more applications;
  receiving, by the communication device, an input indicative of a selection of one of the multiple privacy access level settings; and
  in response to receiving the input indicative of the selection, controlling access to the geolocations of the communication device for the one or more applications associated with the particular application service provider in accordance with the one selected privacy access level setting.

20. The non-transitory computer-readable medium of claim 15, the operations further comprising:
  defining a particular one of the first privacy access level setting, the second privacy access level setting and the at least one third privacy access level setting as a default privacy access level setting for the one or more applications; and
  assigning the default privacy access level setting to the one or more applications when none of the one or more privacy access level settings is assigned to be utilized as a corresponding privacy access level setting for the one or more applications.

* * * * *